(12) United States Patent
Cho

(10) Patent No.: US 11,124,048 B2
(45) Date of Patent: Sep. 21, 2021

(54) AIR VENT KNOB FOR A VEHICLE

(71) Applicant: Nifco Korea, Inc., Asan-si (KR)

(72) Inventor: Tae Hyung Cho, Asan-si (KR)

(73) Assignee: NIFCO KOREA INC., Asan (KR)

( * ) Notice: Subject to any disclaimer, the term of this patent is extended or adjusted under 35 U.S.C. 154(b) by 0 days.

(21) Appl. No.: 15/120,034

(22) PCT Filed: Feb. 24, 2015

(86) PCT No.: PCT/KR2015/001752
§ 371 (c)(1),
(2) Date: Aug. 18, 2016

(87) PCT Pub. No.: WO2015/126222
PCT Pub. Date: Aug. 27, 2015

(65) Prior Publication Data
US 2017/0057326 A1 Mar. 2, 2017

(30) Foreign Application Priority Data
Feb. 24, 2014 (KR) .................. 10-2014-0021211

(51) Int. Cl.
*B60H 1/34* (2006.01)
(52) U.S. Cl.
CPC .......... *B60H 1/3421* (2013.01); *B60H 1/3414* (2013.01); *B60H 2001/3471* (2013.01)
(58) Field of Classification Search
CPC ........................... B60H 1/3421; B60H 1/3414
USPC ....................................................... 454/155
See application file for complete search history.

(56) References Cited

U.S. PATENT DOCUMENTS

| | | | | |
|---|---|---|---|---|
| 2007/0111653 A1* | 5/2007 | Endou | .................. | B60H 1/3421 454/155 |
| 2009/0286462 A1* | 11/2009 | Goto | .................... | B60H 1/3428 454/155 |
| 2014/0199932 A1* | 7/2014 | Mercey | ................ | B60H 1/3421 454/162 |

FOREIGN PATENT DOCUMENTS

| | | | | |
|---|---|---|---|---|
| EP | 1080959 A2 * | 3/2001 | ........... | B60H 1/3421 |
| JP | 05-082617 | 11/1993 | | |
| JP | 10-250357 | 9/1998 | | |
| JP | 2009-096279 | 5/2009 | | |
| KR | 20110071502 A * | 6/2011 | | |

* cited by examiner

*Primary Examiner* — Allen R Schult
(74) *Attorney, Agent, or Firm* — Porter, Wright, Morris & Arthur, LLP

(57) ABSTRACT

An air vent knob assembly includes an air vent wing coupled to an assembly hole of a knob. A front stopper is formed on the front surface and a knob fitting groove is formed on the rear surface of the air vent wing. An assembly groove is formed inside the assembly hole of the knob and a piece of rubber is assembled into the assembly groove. A front slide groove is formed on the piece of rubber wherein the front stopper of the air vent wing is fitted and moved in the front slide groove. A rear stopper is formed on both ends of the rear portion of the knob. Wherein the front stopper contacts ends of the front slide groove and the rear stopper contacts sides of the knob fitting groove upon full movement of the knob relative to the air vent wing in both directions.

7 Claims, 3 Drawing Sheets

[Fig. 1]
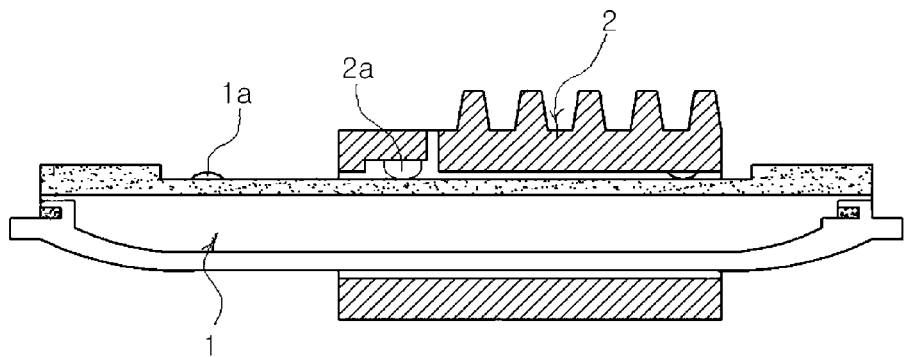
[Fig. 2]
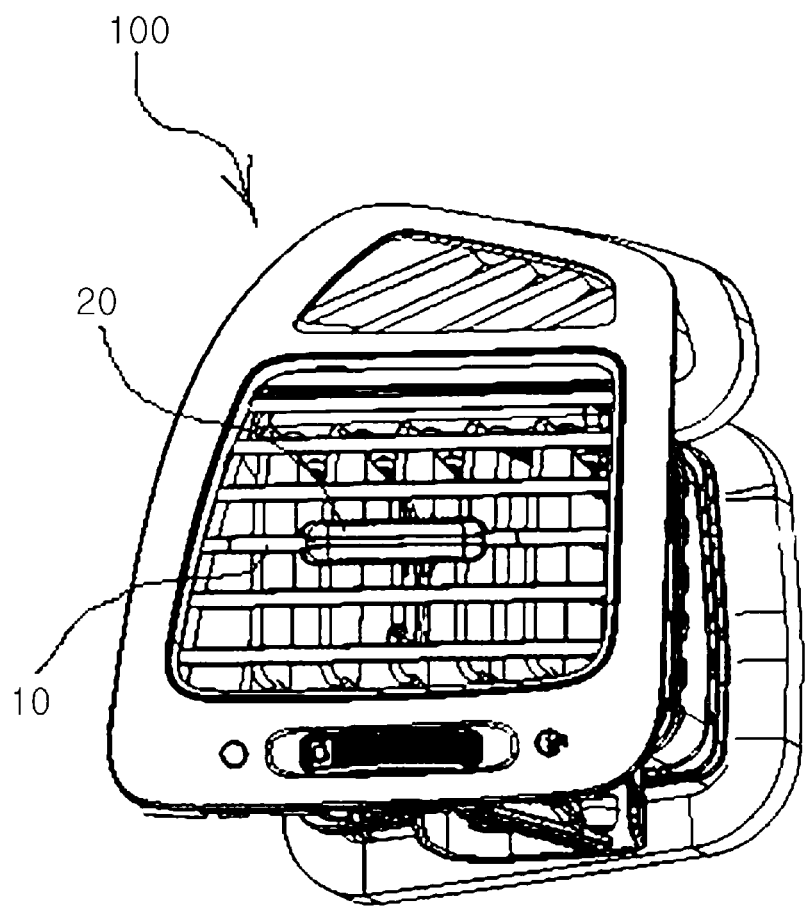

[Fig. 3]
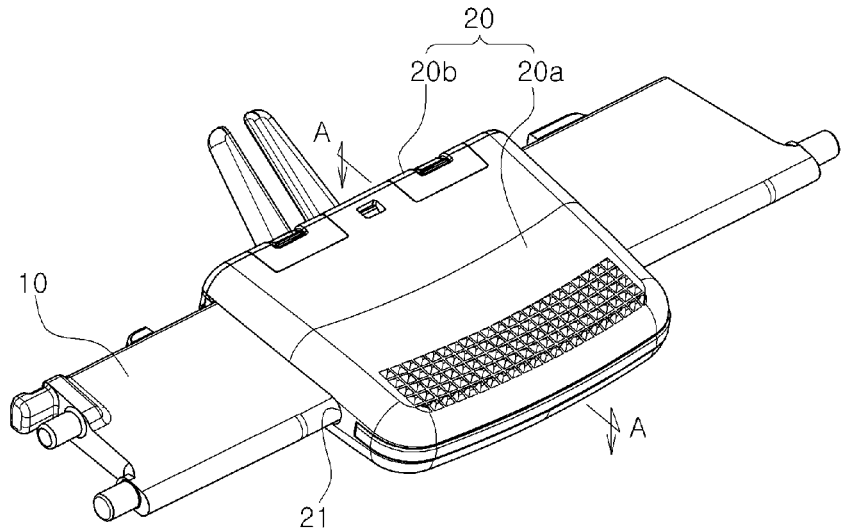
[Fig. 4]
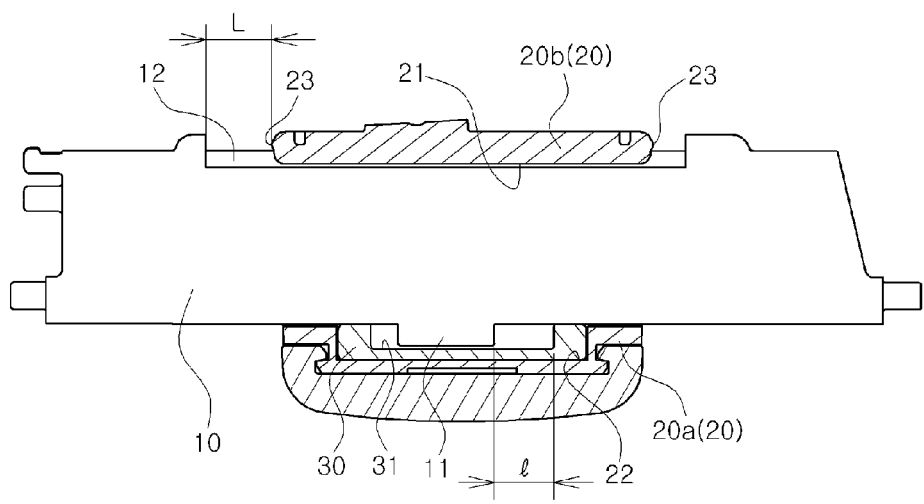
[Fig. 5]
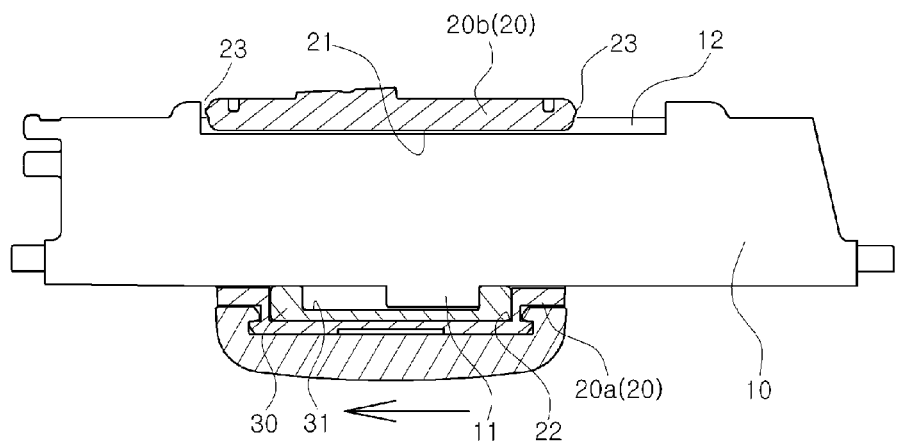

[Fig. 6]
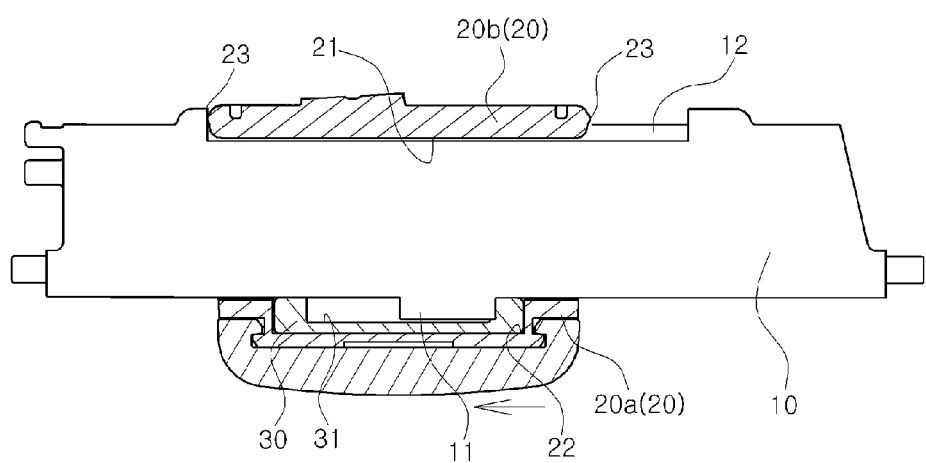

AIR VENT KNOB FOR A VEHICLE

TECHNICAL FIELD

The present invention relates to an air vent knob for a vehicle, and more particularly to enhance the operation feeling and the quality by reducing impact sound resulting from the movement of a knob adjusting the wind direction of an air vent.

BACKGROUND ART

In general, an air vent for a vehicle is an air discharge means of an air conditioning system for appropriately maintaining the temperature of a vehicle room.

Using said air conditioning system, warm air or cold air is discharged through the air vent, and it becomes important for the air vent in aspect of design, operability and convenience as it is exposed to a vehicle indoor.

Korean Patent No. 10-1305807 is the conventional art which can reduce a friction with a wing body in operation of the knob, and as shown in FIG. 1, one protrusion (2a) is formed inside a slit of a knob (2) and a protrusion (1a) running over the protrusion (2a) is formed at both ends of the slide part of an air vent wing (1) inserted into the slit of the knob (2).

Therefore, if the air vent wing (1) is moved to the position of the top dead point or the bottom dead point, the user feels clicking sound and vibration while the protrusion (2a) of the knob (2) runs over the protrusion (1a) of the air vent wing (1).

This gives the feeling to the user that the discharge port of the air vent is completely blocked, thereby the knob operability of the air vent can be enhanced.

Although the prior art as above allows the user to recognize the block of the air vent due to vibration and sound resulting from the operation of the knob, it is inconvenient for the user since certain amount of operation load and impact sound are caused while the protrusion of the knob which is the mean of the above recognition runs over the protrusion of the air vent wing.

PRIOR ART DOCUMENT

Patent Document 1

Korean Patent Publication No. 10-1305807, Air vent wing assembly, published on 6 Sep. 2013

SUMMARY OF THE INVENTION

Problems to be Solved by the Invention

The present invention has been made so as to resolve the above-described problems, and its object is to provide an air vent knob for a vehicle, wherein in case that the user operates the knob, impact or noise is not allowed to generate and the operation feeling can be enhanced.

Another object of the present invention is to provide an air vent knob for a vehicle, wherein it is not necessary to use separate parts for preventing impact sound in assembly process of the wing body and the knob, thereby improving work efficiency due to the reduction of assembly process.

Means for Solving the Problems

In order to achieve the above and any other objects of the present invention, according to one aspect of the present invention there is provided with an air vent knob for a vehicle including: an air vent wing (10) provided on the front surface of an air vent and guiding the direction of wind being discharged, where the air vent wing (10) is coupled to an assembly hole (21) of a knob (20);

wherein a front stopper (11) is formed on the front surface and a knob fitting groove (12) is formed on the rear surface of the air vent wing (10) coupled to the knob (20), an assembly groove (22) is formed at the front portion inside the assembly hole (21) of the knob (20), thereby a rubber (30) is assembled thereinto, a front slide groove (31) is formed on the rubber (30) wherein the front stopper (11) of the air vent wing (10) is fitted and moved in the front slide groove (31), and a rear stopper (23) is formed on both ends of the rear portion of the knob (20), where the rear stopper (23) contacts the inner surface of both sides of the knob fitting groove (12) of the air vent wing (10).

Further, a movement distance (l) in which the front stopper (11) of the knob (20) moves right and left along the front slide groove (31) is smaller than a movement distance (L) in which the rear stopper (23) moves right and left along the knob fitting groove (12), wherein the front stopper (11) contacts the wall of the front slide groove (31) of the rubber (30) in advance.

Further, depending on the movement of the knob (20), in case that the front stopper (11) contacts one wall of the front slide groove (31) of the rubber (30), the rear stopper (23) is positioned being spaced apart from the one wall of the knob fitting groove (12), and in case that the rear stopper (23) contacts one wall of the knob fitting groove (12), the front stopper (11) overlaps with the wall of the front slide groove (31).

Effect of the Present Invention

The air vent knob of a vehicle according to the present invention in the above configuration includes an elastic rubber inserted into the knob, and by using this rubber, allowing to preventing impact and noise with the knob in movement operating of the air vent wing.

Therefore, the present invention is a very useful invention that provides the enhanced operation feeling to change the position of the air vent wing depending on the operation of the knob and the shortened working hours due to the reduction of assembly process and the easy assembly.

BRIEF DESCRIPTION OF THE DRAWINGS

FIG. 1 is a cross sectional view showing the embodiment according to a conventional knob operation.

FIG. 2 is a perspective view showing a configuration of the general air vent.

FIG. 3 is a combined perspective view of the knob and air vent wing of the present invention.

FIG. 4 is an A-A line cross sectional view of the knob and air vent wing of the present invention.

FIG. 5 is a cross sectional view in a state being firstly contacted a rubber, depending on the operation of the knob as an embodiment of the present invention.

FIG. 6 is a cross sectional view in a state being secondly contacted an air vent wing, depending on the operation of the knob.

BEST MODE FOR CARRYING OUT THE INVENTION

Hereinafter, embodiments of the present invention will now be described with respect to the configuration in detail with reference to the drawings.

An air vent knob for a vehicle according to the present invention is provided to enhance the operation feeling and the quality by reducing impact sound resulting from the movement of a knob adjusting the wind direction of an air vent.

First of all, explaining the approximate reference of direction used in the present description with reference to FIG. 2 and FIG. 3, a knob (20) is provided being exposed on the front surface of an air vent (100) for a vehicle, wherein a position of an air vent wing (10) is changed by operating the knob (20), thereby discharging warm air and cold air introduced through the inner air path of the air vent to a vehicle room.

The air vent wing (10) which is adjusted in the up and down direction is coupled into an assembly hole (21) of the knob (20) and an air vent wing (not shown) which is adjusted in the right and left direction is coupled into an fitting hole of a rear portion of the knob (20). Therefore, the user can easily convert the direction of wind in up and down/right and left, depending on the operation of the knob (20).

Further, the present invention discloses that the air vent wing (10) positioned at the front surface of the air vent is coupled to the knob (20), wherein the air vent wing (10) is adjusted in the up and down direction. However, it should be recognized that the present invention is also applicable to a product of which an air vent is coupled to the knob, wherein as another embodiment, the air vent wing which is adjusted in the right and left direction is positioned at the front surface of the air vent.

In addition, the knob (20) is provided with a knob body (20a) which includes an assembly hole (21) being coupled to the air vent wing (10) which is adjusted in the up and down direction and a rear cover (20b) which includes a fitting hole being fitted into the air vent wing which is adjusted in the right and left direction and being coupled to a rear portion of the knob body (20a), wherein the cover (20a) blocks the assembly hole (21).

Therefore, the air vent wing (10) is positioned at the assembly hole (21) of the knob body (20a) and the rear cover (20b) is coupled to the knob body (20a) at the rear portion thereof, thereby fixing the air vent wing (10) to the knob (20) such that the direction of the air vent wing (10) can be adjusted depending on the operation of the knob (20).

At this time, a front stopper (11) is formed on the front surface of the air vent wing (10) being coupled to the knob (20), and a knob fitting groove (12) is formed on the rear surface thereof.

Inside the assembly hole (21) of the knob (20), an assembly groove (22) is further provided to the front portion where a rubber (30) with elastic material is assembled.

A front slide groove (31) is formed on the rear surface of the rubber (30) where the front stopper (11) of the air vent wing (10) is fitted thereinto and moved, wherein the front stopper (11) can move in the right and left direction along the front slide groove (31).

Moreover, the rear cover (20b) of the knob (20) is positioned and fitted into the knob fitting groove (12) and a rear stopper (23) is formed to protrude from the ends of both sides of the rear cover (20b), wherein the rear stopper (23) contacts the inner surface of both sides of the knob fitting groove (12).

A movement distance (l) in which the front stopper (11) of the knob (20) moves right and left along the front slide groove (31) is approximately 0.5 mm smaller than a movement distance (L) in which the rear stopper (23) moves left and fight along the knob fitting groove (12). It is important for the front stopper (11) to contact the wall of the front slide groove (31) of rubber (30) in advance.

That is, explaining the embodiments of the present invention in the above structure, as shown in FIG. 5, in case that the front stopper (11) contacts the right wall of the front slide groove (31) of the rubber (30), depending on the left movement of the knob (20), the rear stopper (23) is positioned being spaced 0.5 mm apart from left wall of the knob fitting groove (12).

Therefore, even if the user operates the knob (20) in a single direction so as to convert the direction of the air vent wing (10), by contacting the front stopper (11) to the elastic rubber (30) the impact and the impact sound are not generated and the operation feeling can be enhanced.

In case that the knob (20) further moves left in the state being contacted the front stopper (11) to the rubber (30), as shown FIG. 6, the rear stopper (23) contacts the left wall of the knob fitting groove (12) and the front stopper (11) overlaps with the right wall of the front slide groove (31).

Therefore, as described hereinabove, the one side of the front slide groove (31) is overlapped with the front stopper (11) such that the rubber (30) is shrunk. If the user's operation force is removed, the one shrunk side of the front slide groove (31) is restored and the front stopper (11) is pushed as in the state of FIG. 5.

That is, in case that the user rapidly moves the knob (20) to the left, by contacting the rear stopper (23) with the knob fitting groove (12) after the front stopper (11) contacts the elastic rubber (30) in advance, thereby preventing the impact and the impact sound before happens while the knob moves.

The embodiments described above are to be understood as a few illustrative examples of the present invention. It will be understood by those skilled in the art that various modifications, combinations and changes may be made to the embodiments without departing from the scope of the present invention.

What is claimed is:

1. An air vent knob assembly for an air vent of a vehicle comprising:
   an air vent wing provided on a front surface of the air vent and guiding a direction of wind being discharged;
   wherein the air vent wing is coupled to an assembly hole of a knob;
   wherein a front stopper is formed on a front surface of the air vent wing coupled to the knob and a knob fitting groove is formed on a rear surface of the air vent wing coupled to the knob;
   wherein an assembly groove having opposing ends is formed at a front portion of the assembly hole of the knob and a separate piece of resilient rubber is assembled into the assembly groove for movement with the knob;
   wherein a front slide groove having opposing resilient rubber ends is formed on the piece of resilient rubber and the front stopper of the air vent wing is fitted and moved in the front slide groove;
   wherein the piece of resilient rubber forms each of the opposing resilient rubber ends and a bottom of the front slide groove, the piece of resilient rubber fully engages the opposed ends of the assembly groove and a bottom of the assembly groove, and the bottom of the assembly groove extends uninterrupted between the opposed ends of the assembly groove;
   wherein the resilient rubber ends of the front slide groove formed in the piece of resilient rubber contact the front stopper of the air vent wing when the knob is moved along the air vent wing in each direction to the front stopper;

wherein a rear stopper is formed on both ends of a rear portion of the knob;

wherein the rear stopper contacts sides of the knob fitting groove of the air vent wing to limit movement of the knob relative to the air vent wing when the knob is moved along the air vent wing in each direction to the sides of the knob fitting groove;

wherein the rear stopper of the knob only contacts one of the sides of the knob fitting groove of the air vent wing when the knob is moved with a force large enough for the front stopper of the air vent wing to contact and compress one of the resilient rubber ends of the front slide groove a distance so that the rear stopper of the knob contacts one of the sides of the knob fitting groove of the air vent wing and impact sound is eliminated when the knob is moved with less than the force;

wherein the knob includes a knob body which includes the assembly hole and a rear cover coupled to a rear portion of the knob body to fix the air vent wing to the knob;

wherein the assembly groove is formed in the knob body;

wherein the rear stopper is formed by the rear cover; and wherein the rear stopper is formed by both outermost sides of the rear cover.

2. The air vent knob assembly for a vehicle according to claim 1, wherein a movement distance in which the front stopper of the air vent wing moves right and left along the front slide groove of the piece of resilient rubber is smaller than a movement distance in which the rear stopper of the knob moves right and left along the knob fitting groove of the air vent wing, and wherein the front stopper contacts the resilient rubber ends of the front slide groove of the piece of resilient rubber before the rear stopper contacts the sides of the knob fitting groove of the air vent wing upon movement of the knob along the air vent wing in each direction.

3. The air vent knob assembly for a vehicle according to claim 1, wherein, depending on a movement of the knob along the air vent wing, when the front stopper of the air vent wing first contacts one of the resilient rubber ends of the front slide groove of the piece of resilient rubber, the rear stopper of the knob is spaced apart from the sides of the knob fitting groove of the air vent wing, and when the rear stopper of the knob contacts one of the sides of the knob fitting groove of the air vent wing, the front stopper of the air vent wing overlaps with the one of the resilient rubber ends of the front slide groove of the piece of resilient rubber.

4. The air vent knob assembly for a vehicle according to claim 1, wherein the piece of resilient rubber is compressed by the front stopper when the rear stopper contacts one of the sides of the knob fitting groove.

5. The air vent knob assembly for a vehicle according to claim 2, wherein the piece of resilient rubber is compressed by the front stopper when the rear stopper contacts one of the sides of the knob fitting groove.

6. The air vent knob assembly for a vehicle according to claim 3, wherein the piece of resilient rubber is compressed by the front stopper when the rear stopper contacts one of the sides of the knob fitting groove.

7. The air vent knob assembly for a vehicle according to claim 1, wherein each of the outermost sides of the rear cover are semi-circular-shaped in cross-section.

\* \* \* \* \*